Patented May 21, 1935

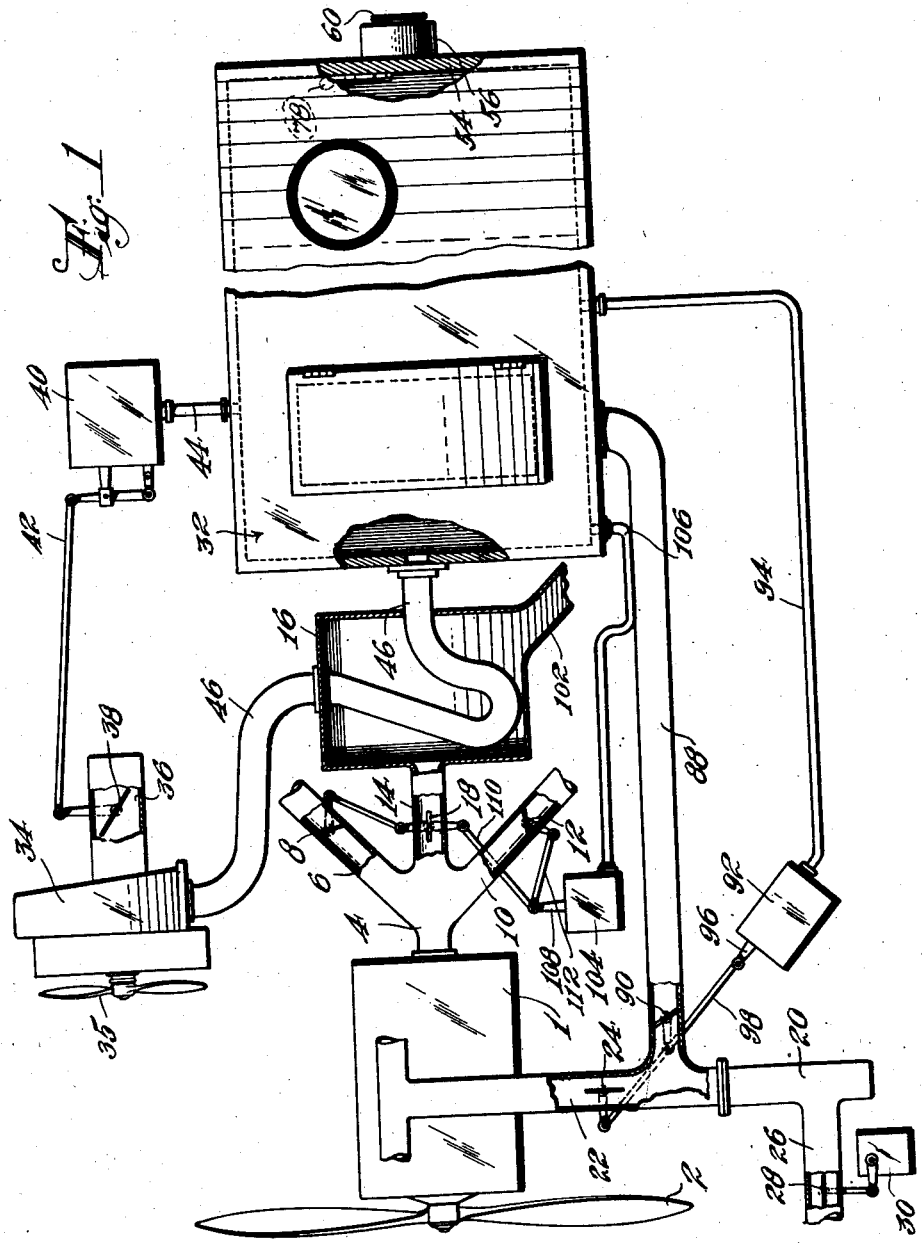

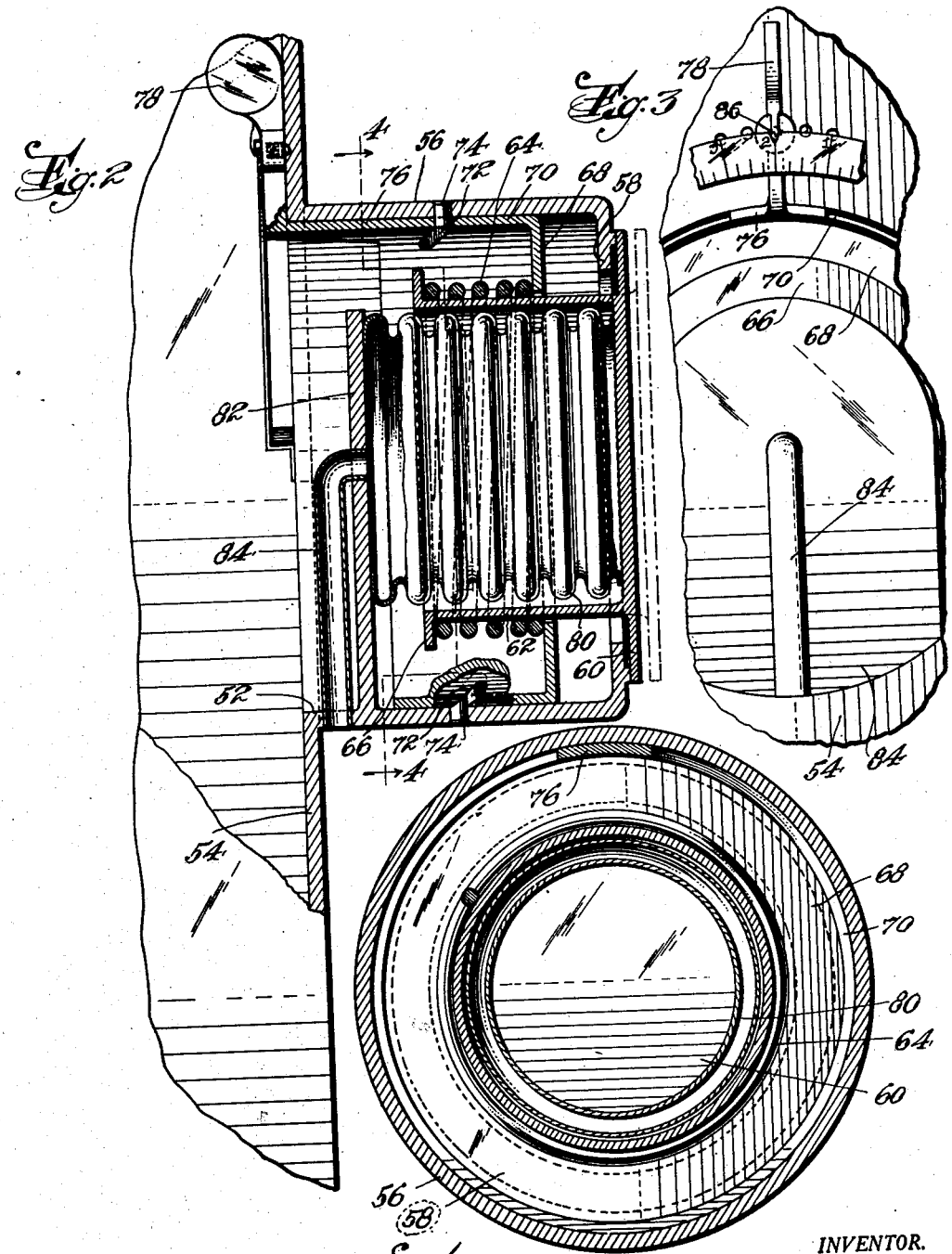

2,002,057

UNITED STATES PATENT OFFICE 2,002,057

AIRCRAFT

David Gregg, Caldwell, N. J., assignor to Bendix Research Corporation, East Orange, N. J., a corporation of Indiana Application May 19, 1931, Serial No. 538,567

5 Claims. (Cl. 244—30)

The invention relates to novel and improved means for maintaining air at suitable pressure in a practically closed or sealed compartment of an aircraft which is operable at various elevations, for supplying fresh air to replace vitiated air therein, and for heating the air supplied.

An object of the invention is to maintain approximately normal atmospheric pressure in a closed or sealed cabin structure, or compartment, of an aircraft, so that at the higher elevations the occupants of such cabin or compartment may breathe normally, thus increasing the practicable range of flight of such craft and avoiding subjection of the occupants to the uncomfortable, injurious or incapacitating effects of low atmospheric pressure.

A further object is to provide, in conjunction with a closed compartment of the foregoing character, novel means for keeping the air inside the compartment fresh and breathable by regularly changing the air supply.

A further object is to properly and controllably warm the supplied air by heat derived from the engine exhaust. This is important because at the higher levels the incapacitating effect of low temperature may be as injurious as low air pressure.

For the stated and other purposes, the invention in the preferred embodiment, as herein disclosed, includes a closed, or sealed, cabin structure or compartment in which the aircraft operating controls may be located; an air pump such as a blower, with driving means (which may vary as later detailed) for supplying external air to the compartment up to a desired maximum pressure (usually about 15 lbs. per sq. in.) a venting or discharge aperture or device, preferably of the nature of a reducing valve, by or through which inside air is expelled at a suitable rate; and means, preferably manually or arbitrarily controllable, for regulating the valve action, whereby to vary the rate or amount of air discharged in a unit of time. Supply control means is provided, preferably of an automatic character, whereby a predetermined compartment pressure may be maintained as the altitude varies. Automatic balancing means are also preferably provided for the discharge valve, to maintain the discharge rate practically constant, as determined by the setting of the arbitrary control means above mentioned.

Provision is also made, when practicable, for maintaining the desired pressure, or an approximation of such pressure, in the compartment, in an emergency, such as in the event of air leakage from the compartment, or partial or complete failure of the blower or other main air supply means. This provision preferably includes an auxiliary or additional compressor, blower or other air supply means; and in cases where the aircraft engine has a supercharger, this is preferably utilized as the auxiliary air supply means, controlling devices being also preferably provided to regulably divert a desired part of the supercharger supply to the closed compartment. Such controlling means may have an automatic action, regulable by the pressure obtaining in the compartment.

For heating, the air conduit from either or both of the stated sources is passed through a chamber, jacket, or the like, to which exhaust gas from the engine is supplied; and this heat supply may be manually, or preferably, as here shown, automatically regulated.

After considering the following detailed description of the accompanying drawings, skilled persons will understand that many variations may be made without departing from the principles disclosed; or the scope of the appended claims.

Fig. 1 is a schematic view of a portion of an aircraft to which the invention may be applied.

Fig. 2 is a sectional view of a discharge, or outlet, valve.

Fig. 3 is a partial end elevation of an air discharge valve as viewed from the left in Fig. 2.

Fig. 4 is a section taken on line 4—4 of Fig. 2.

In Fig. 1, the invention is shown embodied in a suitable aircraft engine 1, with a propeller 2, and an exhaust pipe which, as shown, is manifolded, or branched, at 4, with controlling valves, which may be of "butterfly" or other suitable type, placed in any or all of the pipe branches. Thus, branch 6 is shown as having a valve 8; branch 10, a valve 12; and branch 14, leading to a heating jacket 16, a valve 18. The pipe branches 6 and 10 may, if not used, be omitted or utilized for various purposes, some of which are later mentioned.

The aircraft preferably has a supercharger such as 20, which may be of the blower type driven by the engine through gearing (not shown) with a discharge pipe 22 leading to the engine manifold, and for purposes of the invention, provided with a controlling valve 24. The supply pipe or fitting 26 constituting the blower intake has a controlling valve 28, which is positioned by an automatic regulating unit 30 of known or suitable type. If the supercharger and its auxiliaries are not to be used for the invention purposes, they may of course be omitted, or may be used only for normal engine supercharging.

The compartment 32, indicated diagrammatically, represents any suitable, and suitably located, part or parts of the fuselage, cabin, or the like, of dimensions properly to accommodate the intended number of occupants. It is sufficient to consider a single compartment, since if two or more are provided in one craft, they may be interconnected, or if separate, there may be a corresponding duplication of parts, etc., for each. Broadly, the compartment represents any part or all of the cabin or body of the craft which may be adapted to retain air at suitable pressure, for the purposes of the invention.

Considering the single compartment shown (which may be identified as a "pressure" compartment) it is intended to enclose and retain air at a pressure greater than outside pressure, from the lowest altitude at which reduced air-pressure tends to discomfort, injure or disable occupants of an aircraft, up to any practicable maximum altitude: The compartment 32 has any desired structural features enabling it to retain the desired pressure, while serving other necessary purposes. It is, however, here remarked, that the pressure to be maintained within the compartment need never be, for present purposes, greater than 15 lbs. per sq. in., and there will always be an external, partially balancing pressure, which of course decreases with altitude. The internal pressure may in fact, in many cases, be somewhat less than 15 lbs. without serious discomfort.

For supplying and/or maintaining air at a desired pressure in the compartment, in the preferred embodiment of the invention, a pump or compressor 34 is provided, which is in this instance shown as distinct and independent of any other compressor such as the supercharger-blower 20. As shown, this main pressure-maintaining pump 34 is of the blower type, and has an inlet fitting or pipe 36, with a controlling valve 38, which may be manually or arbitrarily adjusted; preferably, however, an automatic regulator 40 is provided, of known or suitable type. This is connected to the air-supply valve 38 as by a link 42. The regulator is itself under control of pressure within the compartment, to which it is connected by an air tube 44, and the action is such that as compartment pressure drops, the valve is opened proportionately, and vice versa. The blower discharge pipe 46 runs to the compartment, so that air is supplied, under control of the regulator 40, at a rate to maintain the desired pressure therein. The air-supply blower 34 is driven in any of various ways; its shaft may be connected through any suitable gearing to the engine 1, or any one of the propelling engines of a multi-engined craft; or it may be driven by an independent engine, or specifically, as shown, by a wind propeller 35, or by a gas turbine to which exhaust gas may be supplied as through one of the pipe branches shown.

If the compartment structure is such that there is any considerable leakage, it may be unnecessary to provide any other discharge means; in most cases, however, any considerable leakage is not contemplated, and the structure is such that normally it does not occur. To provide proper "ventilation," therefore (i. e., continuous fresh air supply), definite, controllable venting, or air-discharge means is preferably provided. The control of this discharge means may be manual (arbitrary) or automatic, or a combined arbitrary and automatic control may be employed, as will appear.

As shown, an air discharge appliance 50 is provided (as shown in detail in Fig. 2) located at or in an aperture 52 in a convenient position in a compartment wall 54. This appliance includes a fixed tube or sleeve 56 inserted and secured in the wall aperture, and having a valve-seat 58. A valve 60 normally engages the seat, and is carried by a sleeve 62. A spring 64 about the sleeve acts between a sleeve-flange 66 and a relatively fixed abutment 68, normally holding the valve closed, or resisting internal pressure which causes valve-opening. Desirably the spring pressure is regulable, and for this purpose the abutment 68 is a flange on a sleeve 70 which may rotate and move axially in the fixed tube or housing 56. Sleeve 70 has a helical slot 72 co-operating with studs 74 or the like, set in the fixed tube 56; and also has an extension 76 leading to the inner end of tube 56, provided with a handle 78, which may move over a scale (not shown) suitably calibrated. By rotating the handle the spring pressure is varied, thus affording a simple means for regulating the air discharge, which may be sufficient in some cases.

Additional valve-regulating means is, however, desirable, to compensate automatically for altitude variations. For this purpose a device 80 in the nature of an axially extensible and contractile sheet-metal bellows, is connected at one end to the valve (within sleeve 62) and at the other to a fixed support 82 extending from tube 56. A pressure-equalizing tube 84 leads from the fixed end of the bellows to an aperture in the wall of fixed tube 56 outside the compartment wall 54. In this way external atmospheric pressure is always applied to nearly the entire inner area of valve 60, practically counter-balancing the external pressure, so that the action of spring 64 is substantially unaffected by the external pressure variations due to changing altitude.

The blower 34 supplies air at a rate sufficient to maintain a predetermined pressure in compartment 32; its regulator 40 positioning the inlet valve 38 in effect controls the air delivered to the compartment, acting not only to compensate for changes in elevation and consequent tendency to variation in the rate at which air will escape through any unavoidable leakage apertures in the compartment-walls, but also compensating for variations in speed of the blower, such as will occur when it is driven in any of the ways above referred to, except by an independent engine. The regulator also varies the supply in accordance with variations in the rate of discharge of air at valve 60.

This discharge valve is adjusted primarily by varying the pressure of spring 64 in the manner above described. With light spring pressure, the valve will naturally open wider (for any given internal pressure), to discharge more air per time unit, while the supply blower will automatically deliver a correspondingly greater volume of air, at the same time maintaining the pressure as predetermined; heavier spring pressure will, conversely, reduce the valve-opening, and volume of air discharged and introduced. This adjustment will be made, usually, in accordance with the number of occupants of the compartment, upon which the rate of exhaustion of the oxygen-content depends. The scale for the adjusting handle 78, above referred to, may be calibrated with numbers corresponding to different numbers of occupants, so that the valve may be properly set by moving the handle to the proper number, in which position it will remain, due to detent 86, until again moved arbitrarily.

The balancing effect of the bellows 80 and tube 84, as above explained, causes the valve action to remain practically constant (for any setting) at different altitudes, although of course this setting may be varied at any time, in accordance with ventilation-requirements.

In a broader aspect of the invention, there is no limitation as to the precise manner in which the supply-blower action is regulated. The described method (by controlling intake air) is advantageous for various reasons; but a similar result for the invention purposes may be obtained by other means or methods, such, for example, as varying the blower-speed.

Air may also be supplied to the compartment by other means, as for example, by diverting to it a part or all of the air which is normally supplied to the engine by a supercharger such as 20, above described. This means or mode of air supply may in some cases be the main or sole means for supplying air at suitable pressure to one or more closed compartments of the craft; otherwise, as herein particularly shown, it is arranged to act as an emergency-supply, effective upon partial or complete failure of the main or normal supply means, (which in this case is the blower 34), and also effective in other emergencies, such as a sudden leak in the compartment.

A branch pipe 88 leads from the pipe 22 (between the supercharger 20 and the engine) to the compartment 32, and in this branch is a controlling valve 90. This valve, and also, preferably, valve 24 in the main pipe leading to the engine, are jointly positioned by any known or suitable automatic regulator 92. As shown, this is an instrument of known type, itself controlled by air pressure in the compartment, through a tube 94. The regulator has an arm 96 connected by a linkage 98, 100 to the arms of valves 90 and 24, in such manner that when valve 90 is closed, valve 24 is wide open. When normal pressure is maintained in the compartment by the main or normal supply means (blower 34), this pressure, applied through tube 94, causes the regulator 92 to maintain the valves in the positions above stated, and as shown in Fig. 1; so that no supercharger air is supplied to the compartment, but is all delivered to the engine as usual, for efficient engine operation at the higher altitudes. If the main blower supply to the compartment is reduced, for any reason, to such extent that the pressure drops to a critical point, for which the automatic regulator 92 is "set", the regulator partially opens valve 90 and closes valve 24, to a corresponding or greater extent, thus diverting a portion of the supercharger output to the compartment, and the valve positions will be automatically readjusted in accordance with pressure-requirements, and altitude variations, substantially as in the case of the main supply-blower when that is functioning normally. Of course this diversion of a part (or in an extreme case, of all) of the supercharging air to the compartment will to a proportionate extent reduce the efficiency of the engine, but this is of minor consequence since the use of the supercharger air is (in this arrangement or mode of operation) an emergency expedient, and is for the protection of the personnel; reduction of engine speed may in fact be desirable under such circumstances since it will cause the plane to lose elevation to a great extent independently of the pilot, or will compel the pilot to fly at lower levels, where the occupants will be comparatively safe, even in the absence of artificial pressure in the compartment.

While the supercharger supply may be used only temporarily and under emergency conditions, it is in such cases effective to prevent, or decrease the degree of, a sudden drop in pressure, which would be especially dangerous at the higher levels.

The supply of air to the sealed compartment, although primarily for the purpose of maintaining pressure therein, at the same time affords an advantageous mode of utilizing the engine exhaust to heat the compartment. Thus, as stated above, one branch 14 of the engine exhaust pipe leads to a heating jacket 16, which has an outlet 102, outside the compartment, and may incidentally act to a certain extent as a muffler. The air supply pipe 46 from the blower 34 is run through this heating jacket, and the air supply is thus heated to a degree which may be arbitrarily or automatically regulated. As shown, automatic temperature regulation is provided, comprising a regulator 104 of suitable type, acting on valves such as 12, 18 and 8 above referred to. The regulator in a preferred example includes an expansible bellows (similar to the device 80 of the air discharge valve) filled with a temperature-responsive medium such as ether, with a tube 106 running therefrom to a bulb within the compartment; this device being adjusted or "calibrated" to maintain the supplied air at the desired temperature, by positioning the exhaust control valves. Thus, the arm 108 of the regulator, which is positioned by the bellows, is connected by a linkage 110, 112 to valve 18 in pipe 14, and at least one of the other valves such as valve 12 in pipe 10, in such manner that as valve 12 is closed, valve 18 is opened; thus in effect "by-passing" the exhaust gas in accordance with heat-requirements.

The heater as shown is of elementary character, but manifestly it may be of any type desired (compatible with reasonable weight) to provide sufficient heat-transfer to the air supply. The regulator 104 may be of other suitable type, and details of this instrument, per se, are not part of the invention.

As to the exhaust pipe arrangement, it is sufficient for heating purposes to provide two branches, one leading to the heater and the other to any other desired discharge point. When a third branch such as 6 is provided, as shown, it may be for the purpose of supplying a desired portion of the exhaust to a gas turbine for driving the supply blower 34.

The locations of various parts as shown are chosen largely for illustrative convenience, and may be varied considerably; thus, for example, the heating jacket 16 may actually be within the closed compartment. Likewise, other changes and modifications, which will now appear to those skilled in the art, may be made without departing from the scope of the present invention.

What is claimed is:

1. In an aircraft having a propelling engine and an engine supercharger, a closed personnel-compartment, and means controlled by compartment-pressure for diverting supercharger-air to the compartment to maintain a substantial air-pressure therein, said means comprising a branch air conduit leading from the main supercharger discharge conduit to the compartment, and interconnected valves in the conduits.

2. In an aircraft having a propelling engine, a closed compartment, means for supplying air thereto, a heating jacket through which the air supply passes, an engine-exhaust pipe system including two branches, one leading to the heating jacket and the other to another discharge-point, valves in said branches, and a thermostatic regulator connected to position the valves and divert exhaust gas to the jacket in accordance with compartment temperature, to maintain substantially uniform temperature therein.

3. In an aircraft having a propelling engine and a supercharger, a pressure compartment, a wind driven blower for normally supplying air at substantial pressure to the compartment, and means for supplying supercharger air to the compartment.

4. In an aircraft having a propelling engine and a supercharger, a pressure compartment, a wind driven blower for normally supplying air at substantial pressure to the compartment, and means for supplying supercharger air to the compartment, the last-named means comprising a conduit from the main supercharger conduit to the compartment, valves in the conduits, and a valve-regulator controlled by compartment pressure.

5. In an aircraft having a propelling engine and a supercharger, a pressure compartment, wind driven means for normally supplying air at substantial pressure to the compartment, and means controlled by compartment-pressure for supplying supercharger air to the compartment, the last-named means being adapted to act upon an abnormal pressure-drop to divert some or all of the supercharger air to the compartment.

DAVID GREGG.